UNITED STATES PATENT OFFICE.

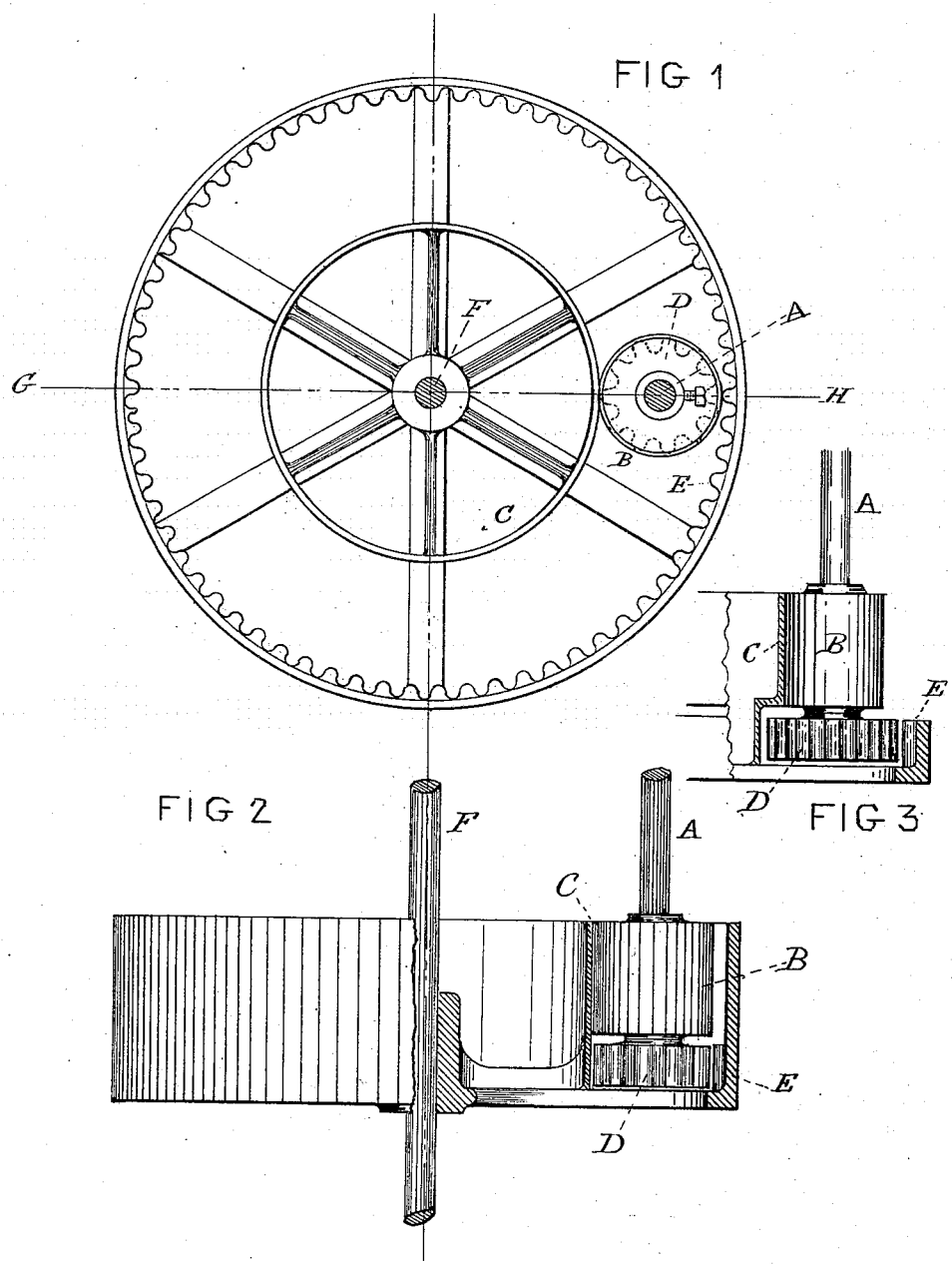

HAMILTON DUDLEY COLEMAN, OF NEW ORLEANS, LOUISIANA.

REVERSING-GEAR.

SPECIFICATION forming part of Letters Patent No. 322,797, dated July 21, 1885.

Application filed June 15, 1885. (No model.)

*To all whom it may concern:*

Be it known that I, HAMILTON DUDLEY COLEMAN, a citizen of the United States, residing at New Orleans, in the parish of Orleans and State of Louisiana, have invented certain new and useful Improvements in Reversing-Gear; and I do hereby declare that the following is a full, clear, and exact description of the same, reference being had to the annexed drawings, making a part of this specification, and to the letters and figures of reference marked thereon.

This invention relates to certain new and useful improvements in reversing mechanism for presses and other purposes whereby I obtain certain new combinations, as will be hereinafter explained.

The object of my invention is to produce a reversing-gear embracing a combination of a friction driver-wheel and driver-pinion, both fixed on the driving-shaft, with a combination of an internal gear-wheel and friction-wheel, both fixed on the driven shaft and arranged so that when the driver friction-wheel is pressed against the driven friction-wheel the driver toothed pinion is out of gear, and when a reverse motion is desired on driven shaft the driver friction-wheel is removed from contact with the driven friction-wheel, the toothed pinion enters into gear with the driven internal-geared wheel, and the driven shaft has its motion reversed at a different speed.

Reference is made to the accompanying drawings, in which Figure 1 is a front elevation of reversing-gear, both frictional and toothed. Fig. 2 shows a side elevation and partly in section through line G H. Fig. 3 is part of a section showing a construction to obtain the driver friction-wheel and the driver cogged wheel of different diameters.

The following is a description of Figs. 1 and 2: A is the driving-shaft, which must be provided with any suitable means whereby the shaft A may have a motion to throw its friction-driver B with pressure against the friction-driven wheel C or its toothed driver, D, into gear with the toothed-driven wheel E.

It is obvious that when the friction-driver B is in contact under pressure with the driven friction-wheel C the driven shaft F revolves in one direction, and on reversing the operation when the toothed driver D gears with the toothed-driven wheel E the motion of the shaft F is reversed at a different speed, which in the case of the application to a press would furnish the power for pressing, while the friction-wheels would be used for the backing down of the press. The proportions are so arranged that both the driver toothed-pinion D and the friction driver-wheel B can revolve without either coming in contact with the toothed wheel E or the friction-wheel C, so that in that case the shaft F would remain stationary. The arrangement of friction and cogged gearing may also be reversed—that is, the cogged gearing may be on the inner wheel and the outer wheel worked by friction—in which case the positions of the cogged and friction wheels on driver-shaft will be reversed and a corresponding change of driven wheels be made on driven shaft.

In order to permit the use of gear and friction drivers of different diameters, if material difference of speed is desired, the driven-wheel C, Fig. 3, may be constructed with such width and form of face or be so attached to the shaft F as to bring the face of that wheel out of the plane of the toothed driver D at its periphery, and the toothed driven-wheel E at the point where the friction-driver B would come in contact therewith, as shown in sectional drawing Fig. 3.

What I claim and desire to secure by Letters Patent is—

A reversing-gear provided with a friction-wheel and a cogged wheel, both fast on one shaft, driven by a cogged pinion and a friction-wheel, both fastened on one driver-shaft, which is provided with a means of obtaining motion so as to engage or disengage the cogged or friction surfaces, substantially as described.

HAMILTON DUDLEY COLEMAN,

Witnesses:
ANDREW HERO, Jr.,
FREDERIC COOK.